United States Patent [19]
Kohno

[11] Patent Number: 5,878,287
[45] Date of Patent: Mar. 2, 1999

[54] LENS BARREL COMPRISED OF A METAL-ENCASED PLASTIC CYLINDER

[75] Inventor: Hisanori Kohno, Izumiootsu, Japan

[73] Assignee: Minolta Co., Ltd., Osaka, Japan

[21] Appl. No.: 626,348

[22] Filed: Apr. 2, 1996

[30] Foreign Application Priority Data

Apr. 4, 1995 [JP] Japan .................................. 7-078649

[51] Int. Cl.$^6$ ................................................ G03B 17/00
[52] U.S. Cl. .......................................... 396/72; 396/529
[58] Field of Search ........................... 354/286; 359/819, 359/820, 821, 822, 823, 824, 825, 826, 827, 828, 829, 830; 396/72, 529, 530, 75, 85

[56] References Cited

U.S. PATENT DOCUMENTS

| | | | |
|---|---|---|---|
| 4,297,002 | 10/1981 | Meatabi | 359/825 |
| 5,289,221 | 2/1994 | Yoon | 396/72 |
| 5,414,213 | 5/1995 | Hillburn | 174/36 |

*Primary Examiner*—Eddie C. Lee
*Attorney, Agent, or Firm*—Burns, Doane, Swecker & Mathis, LLP

[57] ABSTRACT

In a lens mount system of a camera including a plurality of lens mounts relatively moving each other by a cam system, at least one of the lens mounts has a plastic cylinder formed cam grooves and a seamless aluminum cylinder provided around the plastic cylinder so as to wrap the plastic cylinder.

5 Claims, 2 Drawing Sheets

FIG. 2
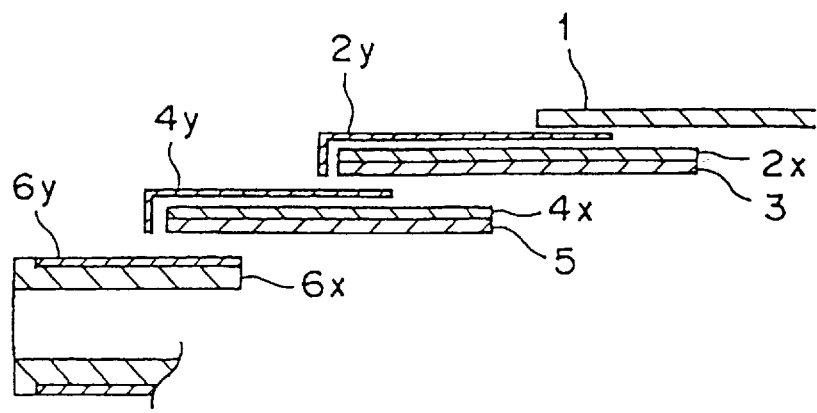
FIG. 3 (I)
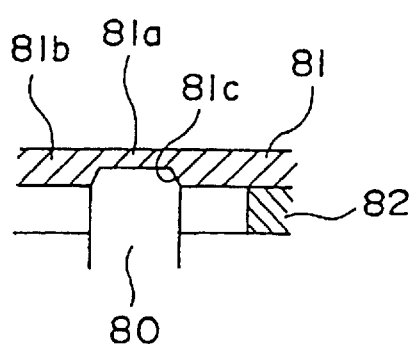
FIG. 3 (II)
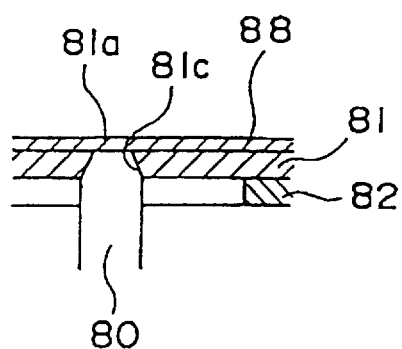

LENS BARREL COMPRISED OF A METAL-ENCASED PLASTIC CYLINDER

BACKGROUND OF THE INVENTION

1. Field of the Invention

The present invention pertains to a lens barrel used in a camera.

2. Description of the Related Art

Lens shutter cameras are widely used because of their compact size, ease of use and portability. It is common to use a plastic cylinder for the lens barrel used in this type of camera. Since there is an increasing demand for further reductions in the size of such lens shutter cameras in recent years, it is necessary to make the lens mount smaller.

However, when the lens diameter, shutter aperture diameter, etc. are fixed, the size of the outer diameter of the lens mount is determined almost entirely by the number of zoom units used. While it is possible to make the lens mount thinner in order to achieve further compactness, this would mean a reduction in strength. In order to increase the strength, U.S. Pat. No. 5,289,221 proposes the application of a steel sheet to the outer surface of the lens mount. However, a seam of the sheet would run along the length of the lens mount in the direction of the optical axis in this method, which is not preferred because it reduces the quality of its appearance.

In addition, where zoom lenses driven by cams are concerned, since it is necessary to form cam grooves, etc. on the inner side of the lens mount, if the thickness of the wall beneath the bottoms of the cam grooves is excessively reduced, the effectiveness of the wall in shielding light will be hindered and the configurations of the cam grooves will be seen in the appearance of the lens mount due to the change in the thickness of the wall beneath the cam groove bottoms, making it difficult to ensure the quality of the lens mount's appearance.

SUMMARY OF THE INVENTION

The main object of the present invention is to further reduce lens shutter cameras in size.

Another object of the present invention is to reduce the diameter of lens mounts while ensuring strength and light shielding capability.

Yet another object of the present invention is to reduce the diameter of lens mounts while ensuring the quality of the lens mount's appearance.

These and other objects of the present are accomplished by a lens mount comprising a lens holder holding a lens unit, a plastic cylinder for holding said lens holder, and a seamless aluminum cylinder provided around said plastic cylinder so as to wrap said plastic cylinder.

These and other objects, advantages and features of the invention will become apparent from the following description thereof taken in conjunction with the accompanying drawings which illustrate a specific embodiment of the invention.

BRIEF DESCRIPTION OF THE DRAWINGS

In the following description, like parts are designated by like reference numbers throughout the several drawings.

FIG. 2 is a simplified cross-sectional view pertaining to FIG. 1.

FIGS. 3(I) and 3(II) are cross-sectional views of important areas of a cam.

DETAILED DESCRIPTION OF THE PREFERRED EMBODIMENT

Figure 1:
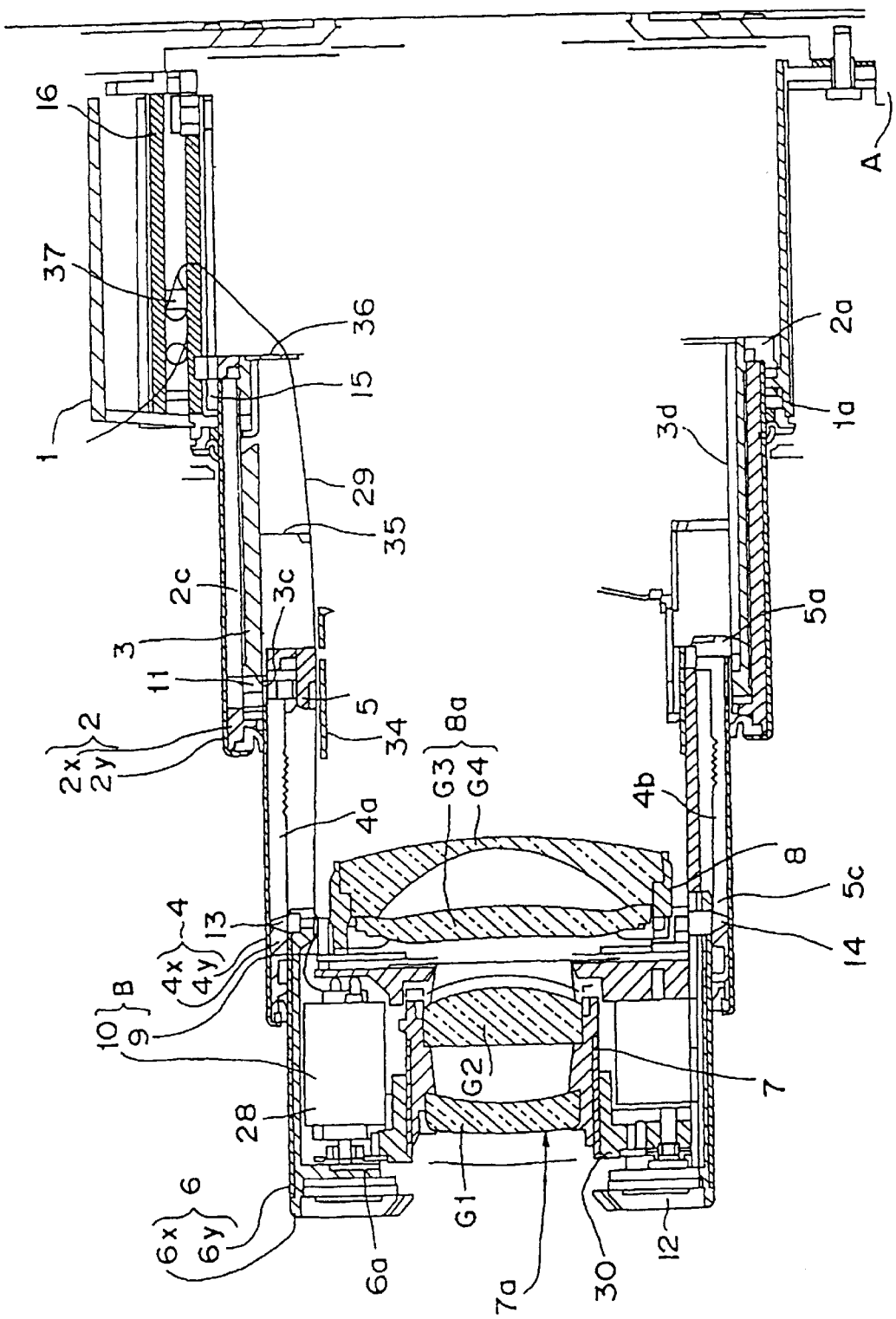
FIG. 1 is a cross-sectional view of a zoom lens system equipped with a lens mount pertaining to an embodiment of the present invention.

A lens mount pertaining to one embodiment of the present invention shown in FIGS. 1 through 3 is explained in detail below.

The lens mount of this embodiment is applied in a zoom lens system that is integrally assembled within a lens shutter camera. FIG. 1 is a cross-sectional view of the zoom lens system having the lens mount of this embodiment. FIG. 2 is a simplified cross-sectional view of the lens mount of this embodiment. FIG. 3 is a cross-sectional view of important areas of a cam.

The zoom lens system shown in FIGS. 1 and 2 is equipped with (i) fixed cylinder 1 forming the first zoom unit, (ii) zoom drive ring 2 and straight moving lead cylinder 3 as a first movable cylinder, which together can be zoomed out of fixed cylinder 1 and forming the second zoom unit, (iii) zoom cam ring 4 and straight moving cylinder 5 as a second drive cylinder, which together can be zoomed out of zoom drive ring 2 and forming the third zoom unit, and (iv) forward moving cylinder 6 that can be zoomed out of zoom cam ring 4 and forming the fourth zoom unit. And the zoom lens system is constructed such that a total of three zoom units, i.e., the second to fourth zoom units, are zoomed out of fixed cylinder 1 of the first zoom unit.

Zoom drive ring 2, zoom cam ring 4 and forward moving cylinder 6 each have a construction wherein plastic cylinders 2x, 4x and 6x are wrapped by aluminum cylinders 2y, 4y and 6y, respectively. In other words, plastic cylinders 2x, 4x and 6x and aluminum cylinders 2y, 4y and 6y are glued together by double-sided adhesive tape to integrally form the rings and cylinder. It is also acceptable to achieve this integration by forming the tip of the aluminum cylinder in the shape of a hook such that the aluminum cylinder may be slipped firmly over the plastic cylinder, taking advantage of the elasticity of the aluminum. Aluminum cylinders 2y, 4y and 6y are seamless deep drawn aluminum rings. The inner surfaces of aluminum cylinders 2y, 4y and 6y have anodic oxide coating (that is, Alumite layer). Preferably, plastic cylinders 2x, 4x and 6x preferably have a thickness of 0.85 to 0.9 mm, while aluminum cylinders 2y, 4y and 6y have a thickness of 0.3 mm. In this thickness range, the overall thickness of the lens mount can be reduced to the maximum extent while its strength and light shielding capability and the quality of the lens mount's appearance is ensured. In other words, the diameters of zoom drive ring 2, zoom cam ring 4 and forward moving cylinder 6 can be reduced.

First lens holder 7 fixes and holds first lens unit 7a comprising two lenses G1 and G2. Second lens holder 8 fixes and holds second lens unit 8a also comprising two lenses G3 and G4. First lens holder 7 is mounted in forward moving cylinder 6, while second lens holder 8 is movably mounted in straight moving cylinder 5. Further, shutter unit 9 and focus unit 10 are fixed and held together with first lens holder 7 in forward moving cylinder 6 such that they form a single block B.

As shown in FIG. 1, fixed cylinder 1 is mounted and fixed to camera body A while zoom drive ring 2 is rotatably mounted to this fixed cylinder 1, and straight moving lead cylinder 3 is also held in said fixed cylinder 1 such that it can move forward and backward along the optical axis. In other words, lead follower 2a is formed on the outer surface of the back end of zoom drive ring 2. This lead follower 2a engages with spiral lead guide 1a formed on the inner surface of fixed cylinder 1 such that zoom drive ring 2 moves forward and backward along the optical axis while rotating by means of lead follower 2a moving along lead guide 1a.

Straight moving lead cylinder 3 is inserted in zoom drive ring 2 and has flange 3a (not shown in the drawing) that protrudes in a direction perpendicular to the optical axis formed on the outer circumference of its back end. Straight lead cylinder 3 is prevented from disengaging from zoom drive ring 2 while being allowed to rotate by means of this flange 3a which forms a bayonet combination with claws (not shown in the drawing) formed at the back end of zoom drive ring 2.

With the combination described above in effect, straight moving lead cylinder 3 moves straight along the optical axis at a 1:1 ratio with zoom drive ring 2 while being prevented from rotating by fixed cylinder 1, by means of a slide protrusion formed on the outer surface of its back end engaging with a straight moving guide (not shown in the drawing) formed in the inner surface of fixed cylinder 1.

Curved lead holes 3c are formed on the wall of straight moving lead cylinder 3, while straight moving grooves 2c are formed on zoom drive ring 2 such that it pierces through the wall of zoom drive ring 2 in a direction perpendicular to the optical axis. Zoom cam ring 4 is inserted in straight moving lead cylinder 3. In this condition, all-unit guide pins 11 screwed in the outer surface of zoom cam ring 4 passes through curved lead holes 3c of straight moving lead cylinder 3 and becomes movably engaged with straight moving grooves 2c of zoom drive ring 2, as a result of which zoom cam ring 4 moves forward and backward by means of all-unit guide pins 11 while rotating via the rotation of straight moving grooves 2c relative to curved lead holes 3c.

Straight moving cylinder 5 is inserted in zoom cam ring 4 and engages with zoom cam ring 4 via bayonet combination. Although the bayonet combination area is omitted in the drawing, its construction is the same as that of the combination between straight moving lead cylinder 3 and zoom drive ring 2. Slide protrusion 5a is formed on the back end of straight moving cylinder 5 such that straight moving cylinder 5 can move straight along the optical axis at a 1:1 ratio with zoom cam ring 4 while being prevented from rotating by straight moving lead cylinder 3, by means of said protrusion 5a engaging with straight moving guide 3d formed on the inner surface of straight moving lead cylinder 3.

Forward moving cylinder 6 holds shutter unit 9 and focus unit 10 as a single unit by means of flange 6a located on the inner surface of its front end. Barrier unit 12 is located on the front surface side of flange 6a. It opens and closes in response to the zoom drive system when the lens mount is zoomed and collapsed, and protects front lens G1 of first lens unit 7a when it is not in use.

First cams 4a that extend in an approximately spiral fashion are located at uniform distances from one another around the circumference of zoom cam ring 4, and second cams 4b are arranged in a similar fashion, such that said first cams 4a and second cams 4b alternate. First cams 4a and second cams 4b pierce through zoom cam ring 4 in a direction perpendicular to the optical axis.

First unit guide pins 13 are forcibly inserted into the outer surface of the back end of forward moving cylinder 6, and these first unit guide pins 13 are engaged with first cams 4a on the inner surface of zoom cam ring 4. A straight moving grooves (not shown in the drawing) are formed on the inner surface of forward moving cylinder 6. These straight moving grooves engage with straight moving ribs (not shown in the drawing) located on the outer surface of the front end of straight moving cylinder 5, as a result of which forward moving cylinder 6 moves straight along the optical axis via the movement of first unit guide pins 13 moving along first cams 4a, while being prevented from rotating by means of the straight moving grooves and the straight moving ribs.

Second lens holder 8 is inserted in and held by straight moving cylinder 5 such that it can move forward and backward along the optical axis. In other words, second unit guide pins 14 protrude from the outer surface of second lens holder 8, said second unit guide pins 14 passing through straight moving holes 5c having an oblong configuration formed on straight moving cylinder 5 and engaging with second cams 4b of zoom cam ring 4, as a result of which second lens holder 8 moves straight along the optical axis by means of second unit guide pins 14 via the rotation of straight moving holes 5c relative to second cams 4b.

On the other hand, drive gear 15 having a large diameter is attached to the outer surface of the back end of zoom drive ring 2. This drive gear 15 engages with zoom drive gear 16 having a small diameter that is positioned at the farthest end of the zoom reduction system and transmits the rotary drive power of a zoom motor (not shown in the drawing) located in camera body A to the zooming mechanism via the zoom drive system. Zoom drive gear 16 comprises an gear elongated along the rotational axis such that it is engaged at all times with drive gear 15 that moves forward and backward by virtue of the forward and backward movement of zoom drive ring 2.

The operation of the zooming mechanism equipped with the three-step zoom construction comprising four zoom units described above will now be outlined. First, the rotary drive power of the zoom motor is transmitted to zoom drive ring 2 from the zoom drive system via zoom drive gear 16 positioned at the farthest end of said system and drive gear 15 having a large diameter. Upon receiving this rotary drive power, zoom drive ring 2 is zoomed out along the optical axis while rotating along the spiral path of lead guide 1a by means of lead follower 2a guided by lead guide 1a of fixed cylinder 1. During this zooming, the teeth of drive gear 15 of zoom drive ring 2 and of zoom drive gear 16 transmit the rotary drive power while said gears slide along the optical axis.

Through the forward movement of this zoom drive ring 2, straight moving lead cylinder 3 moves straight along the optical axis at a 1:1 ratio with zoom drive ring 2 while being prevented from rotating by fixed cylinder 1. Zoom cam ring 4 moves forward along the optical axis while rotating via all-unit guide pins 11 by means of the rotation of straight moving grooves 2c of zoom drive ring 2 relative to curved lead holes 3c of straight moving lead cylinder 3. Straight moving cylinder 5 moves straight along the optical axis at a 1:1 ratio with zoom cam ring 4 while being prevented from rotating by straight moving lead cylinder 3.

Focus shutter block B and second lens holder 8 that holds second lens unit 8a are driven by means of straight moving cylinder 5 moving straight ahead as zoom cam ring 4 moves forward while rotating. In this embodiment, because first cams 4a to move focus shutter block B and second cams 4b to move second lens holder 8 are integrally located on the inner surface of zoom cam ring 4, there are separate drive power transmission systems: one extending from zoom cam ring 4 to focus shutter block B, and the other extending from zoom cam ring 4 to second lens holder 8.

Focus shutter block B that operates together with forward moving cylinder 6 moves forward by means of forward moving cylinder 6 moving straight along the optical axis by the drive power of zoom cam ring 4 while being prevented from rotating by straight moving cylinder 5. Second lens holder 8 moves straight along the optical axis by means of its rotation relative to lead 4b. When zooming is performed in this way, first lens unit 7a and second lens unit 8a move forward while the distance between said lens units is changing by virtue of driving the lens mount from the wide angle range to the telephoto range.

Using the construction explained above, straight moving grooves 2c of zoom drive ring 2 and first and second cams 4a and 4b of zoom cam ring 4 pierce through plastic cylinders 2x and 4x in a direction perpendicular to the optical axis, respectively, and as a result the lens mount can be reduced in size.

In other words, as shown in FIG. 3(I), in a conventional lens mount of a cam-driven zoom lens, cam groove 81c is formed on the inner surface of outer cylinder 81, with pin 80 engaging with said cam groove 81c. Cam bottom 81a of outer cylinder 81 needs to have a certain thickness in order to secure strength, light shielding capability and a high-quality appearance, as a result of which the overall thickness 81b of outer cylinder 81 cannot be reduced. In comparison, in the lens mount constructed in the manner described in the above embodiment, as shown in FIG. 3(II), the outer cylinder, i.e., aluminum cylinder 88 connected to the outer surface of plastic cylinder 81, functions as cam bottom 81a, and therefore the thickness of cam bottom 81a can be made smaller than the conventional model while securing strength and light shielding capability. Accordingly, the thickness of the entire lens mount can be reduced. In other words, the lens mount can be reduced in size using the construction described above.

Further, because grooves 2c and cams 4a and 4b respectively formed on plastic cylinders 2x and 4x pierce through said cylinders, pins 11, 13 and 14 can be easily inserted, which improves the ease of assembly.

Moreover, using the construction described above, seamless aluminum cylinders 2y, 4y and 6y provide the appearance of the lens mount. Their metallic appearance is of a higher quality than that provided by plastic components. The treatment of aluminum cylinders 2y, 4y and 6y with anodic oxide coating improves their light shielding capability and thus helps prevent ghost images.

Although cam bottom of the cam groove formed on the plastic cylinder of the above embodiment pierces the plastic cylinder, the present invention is not limited to this construction. For example, the lens mount can be reduced in size by reducing the thickness of the cam bottom on the plastic cylinder than conventional ones. In this case, the thickness of the cam bottom should be less than 0.6 mm.

The present invention is not limited to the embodiment described above, but may be applied in various other configurations.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. In a lens barrel system including a plurality of lens barrels moving relative to each other by a cam system, at least one of the lens barrels comprising:

a first cylinder made of plastic and having cam grooves formed therein; and a second seamless cylinder made of aluminum metal and provided around said first cylinder so as to wrap said first cylinder, wherein said cam grooves formed in said first cylinder pierce through a wall of said first cylinder and an inner surface of said second cylinder functions as the bottom of said cam grooves.

2. The lens barrel system as claimed in claim 1, wherein the thickness of said one of the lens barrels is less than 1.2 mm.

3. The lens barrel system as claimed in claim 1, wherein the inner surface of said second cylinder has anodic oxide coating.

4. The lens barrel system as claimed in claim 1, wherein said first and second cylinders are glued together.

5. The lens barrel system as claimed in claim 1, wherein said second cylinder is engaged with said first cylinder.

* * * * *